(12) United States Patent
Hamada et al.

(10) Patent No.: US 11,108,694 B2
(45) Date of Patent: Aug. 31, 2021

(54) COMMUNICATION SYSTEM AND UPLOAD METHOD

(71) Applicant: Ricoh Company, Ltd., Tokyo (JP)

(72) Inventors: Yuuta Hamada, Tokyo (JP); Kazuhiro Terayama, Tokyo (JP); Tatsuya Nagase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/352,339

(22) Filed: Mar. 13, 2019

(65) Prior Publication Data

US 2019/0306063 A1 Oct. 3, 2019

(30) Foreign Application Priority Data

Mar. 30, 2018 (JP) .............................. JP2018-068519
Oct. 24, 2018 (JP) .............................. JP2018-200369

(51) Int. Cl.
*H04L 12/803* (2013.01)
*H04L 29/08* (2006.01)
*H04L 12/18* (2006.01)

(52) U.S. Cl.
CPC ........ *H04L 47/125* (2013.01); *H04L 12/1818* (2013.01); *H04L 12/1827* (2013.01); *H04L 67/1036* (2013.01); *H04L 67/322* (2013.01)

(58) Field of Classification Search
CPC ............... H04L 47/125; H04L 12/1818; H04L 12/1827; H04L 67/1036; H04L 67/322
See application file for complete search history.

(56) References Cited

U.S. PATENT DOCUMENTS

| 9,077,621 | B2* | 7/2015 | Hamada | H04L 43/0811 |
| 9,813,393 | B2* | 11/2017 | Consalus | G06F 21/602 |
| 2009/0185509 | A1* | 7/2009 | Lundstrom | H04L 41/0866 370/256 |
| 2010/0036956 | A1* | 2/2010 | Nishikawa | G06F 9/505 709/226 |
| 2011/0246644 | A1 | 10/2011 | Hamada | |
| 2012/0239715 | A1* | 9/2012 | Nishide | H04W 24/08 707/822 |

(Continued)

FOREIGN PATENT DOCUMENTS

| JP | 2011-227868 | 11/2011 |
| JP | 2016-177594 | 10/2016 |

*Primary Examiner* — John A Follansbee
*Assistant Examiner* — Raqiul A Choudhury
(74) *Attorney, Agent, or Firm* — Xsensus LLP

(57) ABSTRACT

A communication system includes a plurality of communication terminals to transmit communication information and a communication controller. Each of the communication terminals includes: a generator to generate log information on communication between the communication terminals; a storage to store log information generated by the generator; and a transmitter to upload log information that is capable of being uploaded depending on a communication line band used for the communication information. The communication controller includes a communication management server configured to control transmission of the communication information and a log upload server, wherein the communication controller is configured to distribute the log information uploaded by the transmitter to the log upload server.

15 Claims, 15 Drawing Sheets

(56) References Cited

U.S. PATENT DOCUMENTS

| | | | | |
|---|---|---|---|---|
| 2013/0321562 A1* | 12/2013 | Takahashi | ............ | H04L 65/403 |
| | | | | 348/14.06 |
| 2014/0195689 A1* | 7/2014 | Gill | .................... | H04L 67/2833 |
| | | | | 709/226 |
| 2014/0280197 A1* | 9/2014 | Gatto | .................. | G06F 11/3476 |
| | | | | 707/741 |
| 2016/0149991 A1* | 5/2016 | Ables | .................... | G06F 16/113 |
| | | | | 707/667 |
| 2016/0277460 A1* | 9/2016 | Ying | .................. | G06Q 10/1095 |
| 2017/0230324 A1* | 8/2017 | Seigel | ..................... | H04L 51/30 |
| 2018/0152393 A1* | 5/2018 | Hoffman | ................. | H04L 67/06 |
| 2019/0065322 A1* | 2/2019 | Chakankar | .......... | G06F 11/1451 |

* cited by examiner

FIG.6

```
{
"Type" :" response"
"Call-ID" :" X-X-X-X"
"Command" :" invite"
"Result" :" 200"
}
```
—2000

2100 —
```
<message to =" id1@example.co.jp" from = " id2@example.co.jp">
<body>
```

2000 —
```
{
"Type" :" response"
"Call-ID" :" X-X-X-X"
"Command" :" invite"
"Result" :" 200"
}
```

2100 —
```
</body>
</message>
```

| TERMINAL ID | TERMINAL NAME | OPERATING STATE | IP ADDRESS |
|---|---|---|---|
| 110001 | OFFICE XX TERMINAL AA | ONLINE (IN CONFERENCE) | 1.2.1.3 |

COMMUNICATION SYSTEM AND UPLOAD METHOD

CROSS-REFERENCE TO RELATED APPLICATIONS

The present application claims priority under 35 U.S.C. § 119 to Japanese Patent Application No. 2018-68519, filed on Mar. 30, 2018 and Japanese Patent Application No. 2018-200369, filed on Oct. 24, 2018. The contents of which are incorporated herein by reference in their entirety.

BACKGROUND OF THE INVENTION

1. Field of the Invention

The present invention relates to a communication system and an upload method.

2. Description of the Related Art

Conventionally, in a communication system performing communications at multiple points such as a multipoint conference system (UCS), communications among terminals used for communications by users are managed by a management system, and data such as video or voice is mutually transmitted among the terminals for communications. In each terminal, log information is recorded. When a trouble occurs, log information is transmitted with user's operation, and an administrator verifies the transmitted log information. In recent years, studies have been made on technologies for allowing a management system to manage log information recorded in each terminal in order to handle troubles.

As one of the technologies, there is a literature that discloses a technology for preventing transmission omission of log information (for example, Japanese Unexamined Patent Application Publication No. 2011-227868).

However, when transmission of log information from a terminal is started during communication, the data communication traffic increases in a communication line shared with video signals. Hence, there may be a problem in that, limitation for degrading the image quality such as video signals is necessary.

SUMMARY OF THE INVENTION

According to one aspect of the present invention, a communication system includes: a plurality of communication terminals configured to transmit communication information, each communication terminal including a generator configured to generate log information on communication between the communication terminals, a storage configured to store log information generated by the generator, and a transmitter configured to upload log information that is capable of being uploaded depending on a communication line band used for the communication information; and a communication controller includes a communication management server configured to control transmission of the communication information and a log upload server, wherein the communication controller is configured to distribute the log information uploaded by the transmitter to the log upload server.

BRIEF DESCRIPTION OF THE DRAWINGS

FIG. 6 is a diagram illustrating an example of log information created by a log information creation unit;

FIG. 7 is a diagram illustrating an example of transmission data created by a message creation unit;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
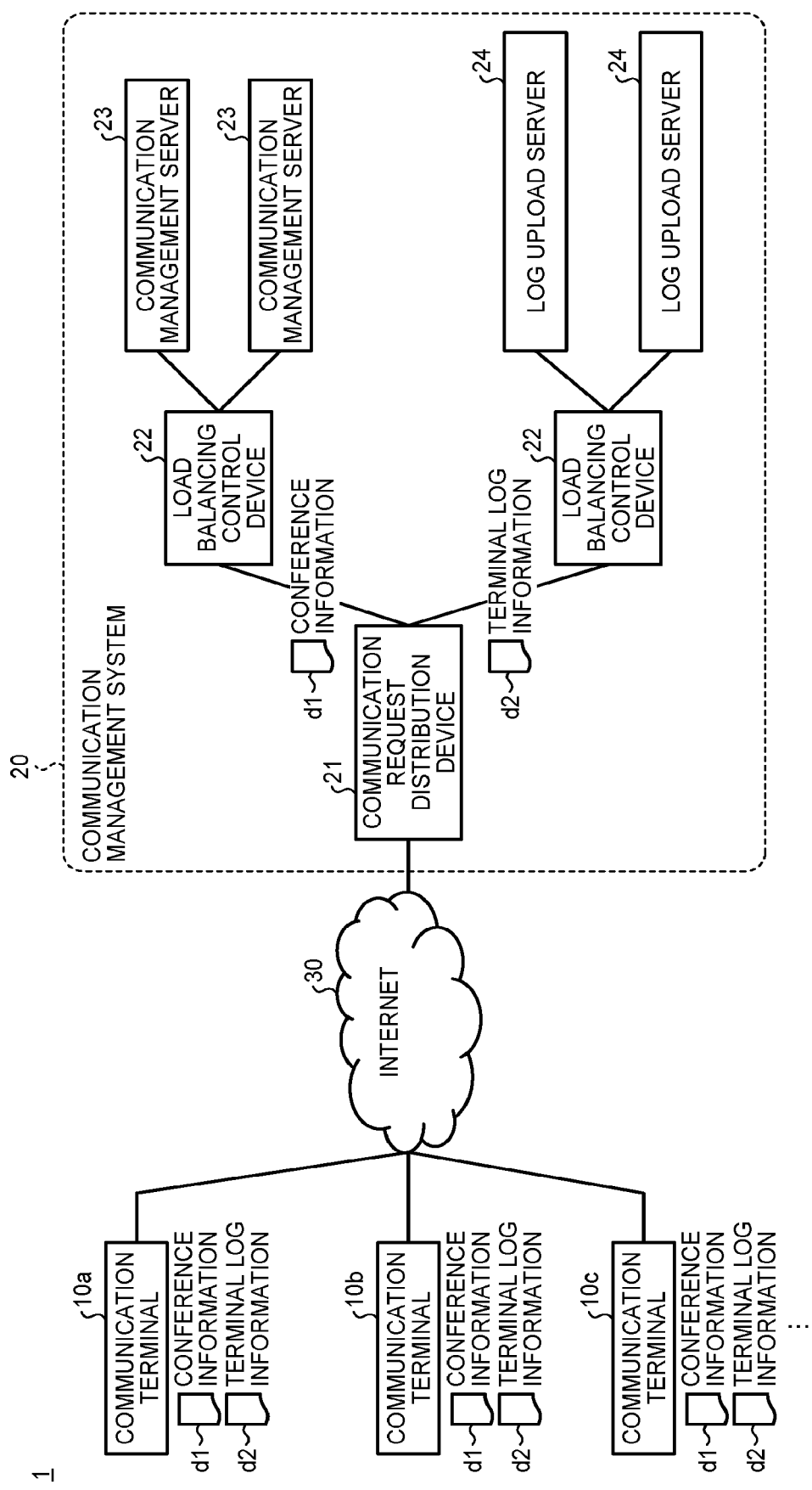
FIG. 1 is a schematic diagram illustrating an example of an overall configuration of a system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of the present patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object an embodiment is to provide a communication system and an upload method, each being capable of reliably transmitting log information without degrading image quality.

Referring to the accompanying drawings, a communication system and an upload method according to embodiments of the present invention will be described in detail below. In the following embodiments, a teleconference is described as an example of communication performed among multiple sites. In a teleconference, conference information (such as voice and/or video) is transmitted as communication information transmitted among multiple sites.

First Embodiment

FIG. 1 is a schematic diagram illustrating an example of a configuration of an overall system according to a first embodiment. Referring to FIG. 1, the outline of the overall system according to the first embodiment is described.

A communication system 1 illustrated in FIG. 1 includes a plurality of communication terminals (10a, 10b, 10c, . . . ) and a communication management system 20. In the following, "communication terminal 10" refers to any of the communication terminals (10a, 10b, 10c, . . . ).

Each of the communication terminals (10a, 10b, 10c, . . . ) is provided on a local area network (LAN) constructed at individual sites of users. For example, the communication terminal 10a is provided on a LAN constructed at a business office in Tokyo, the communication terminal 10b is provided on a LAN constructed at a business office in Osaka, and the communication terminal 10c is provided on a LAN constructed at a business office in Fukuoka. Each of the communication terminals (10a, 10b, 10c, . . . ) accesses the communication management system 20 through the Internet 30. Although not illustrated, a communication network between the communication terminals (10a, 10b, 10c, . . . ) and the communication management system 20 includes a large number of relay devices. The communication network may partially include an area where wireless communication is performed as well as an area where wired communication is performed.

The communication terminal 10 mutually transmits and receives conference information (such as voice and/or video) d1 to and from the other communication terminal(s) 10 through the communication management system 20, thereby performing a multipoint conference. In the multipoint conference, video in the conference information d1 mutually transmitted and received by the communication terminal 10 to and from the other communication terminals 10 may be still images or moving images. The video may include both of moving images and still images.

The communication terminal 10 further transmits terminal log information d2 of this communication terminal 10 to the communication management system 20. The "terminal log information" is log information such as operation contents and processing contents received by the communication terminal 10.

The communication terminal 10 includes a "generator", a "storage", and a "transmitter" as means related to the transmission of the terminal log information d2. The "generator" generates log information on communication between the communication terminal 10 and the other communication terminal(s) 10. The "storage" stores the generated log information. The "transmitter" uploads (or transmits) log information (terminal log information d2) that is capable of being uploaded depending on a communication line band used for the conference information d1. For example, when congestion is caused in the communication line band due to uploading, the "transmitter" uploads terminal log information d2 having a data volume that does not congest the communication line band at such timing.

In the manner described above, the communication terminal 10 performs a multisite conference with the other communication terminals 10 under control of the communication management system 20, and uploads the terminal log information d2 recorded in the multisite conference to the communication management system 20 with a data volume or at timing that does not congest the communication line band used for the conference information d1.

The communication management system 20 is an example of the "communication controller". The communication management system 20 illustrated in FIG. 1 includes a communication request distribution device 21, a load balancing control device 22, a communication management server (device) 23, and a log upload server (device) 24. Part or all of the devices may be constructed in a company that provides a multisite conference system, or may be provided by cloud computing.

The communication request distribution device 21 distributes requests (transmission information) from the communication terminals 10 to the load balancing control devices 22 in a server group that is in charge of corresponding processing depending on the type of requests (conference information d1/terminal log information d2). In the present embodiment, when the type of the request is conference information d1, the communication request distribution device 21 distributes requests to the load balancing control devices 22 in a server group of the communication management servers 23 that manage conference information. When the type of requests is terminal log information d2, the communication request distribution device 21 distributes requests to the load balancing control device 22 in a server group of the log upload servers 24 that manage logs.

The load balancing control device 22 performs communication band limitation, load balancing, and timeout control. In the communication band limitation, a weight is applied to the transmission of requests to a server group depending on an operating rate of a central processing unit (CPU) and a data volume. In the load balancing, requests are transmitted to servers in a server group in an order determined by a predetermined algorithm. In the timeout control, an error is returned to the communication terminal 10 when a response to a request transmitted to the server has not been received in a predetermined period.

The communication management server 23 processes a request related to the conference information d1 on the communication terminal 10.

The log upload server 24 processes a request related to the terminal log information d2 on the communication terminal 10.

Hardware Structure

The hardware structure of the communication terminal 10 and each device included in and the communication management system 20 will be described.

Figure 2:
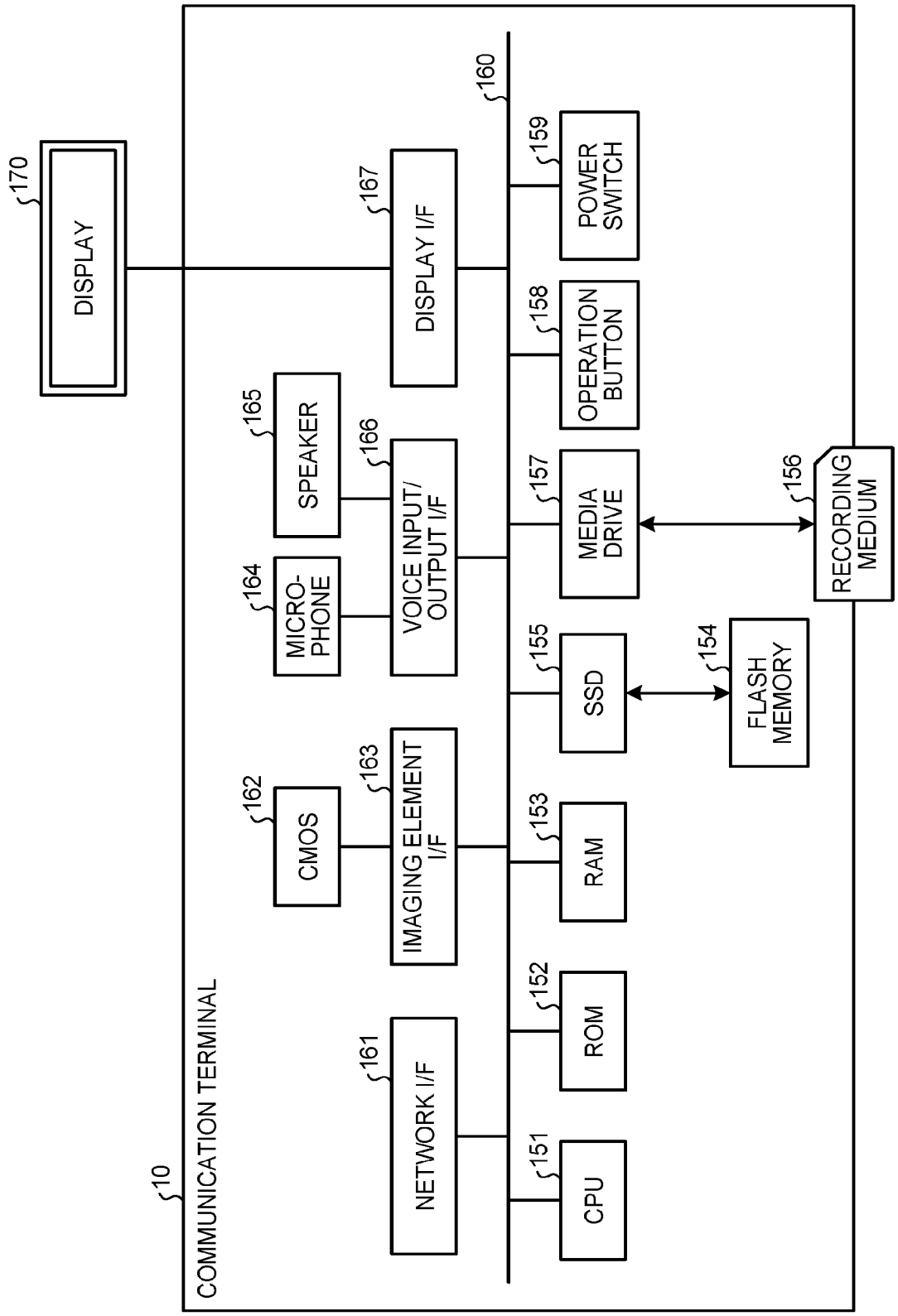
FIG. 2 is a diagram illustrating an example of a hardware structure of a communication terminal.

FIG. 2 is a diagram illustrating an example of the hardware structure of the communication terminal 10. As illustrated in FIG. 2, the communication terminal 10 includes a CPU 151 configured to control the overall operation of the communication terminal 10, a read only memory (ROM) 152 that stores computer programs for communication terminals, a random access memory (RAM) 153 used as a work area of the CPU 151, a flash memory 154 that stores various kinds of data (such as terminal identification (ID) and password for uniquely identifying the local communication terminal 10, various kinds of definition information, terminal log information d2, management table for terminal log information d2, conference information d1 to be transmitted, and received conference information d1), a solid state drive (SSD) 155 configured to control reading or writing of various kinds of data from or to the flash memory 154 in accordance with the control by the CPU 151, a media drive 157 configured to control reading or writing (storing) of data from or to a recording medium 156 such as a flash memory, an operation button 158 to be operated to select a destination of the communication terminal 10, a power switch 159 used to switch ON/OFF of power of the communication terminal 10, a network I/F 161 configured to transmit various kinds of data such as conference information d1 and terminal log information d2, a complementary metal oxide semiconductor (CMOS) 162 configured to image a subject to obtain an image in accordance with the control by the CPU 151, an imaging element I/F 163 configured to control driving of the CMOS 162, a microphone 164 configured to input voice, a speaker 165 configured to output voice, a voice input/output I/F 166 configured to process input/output of a voice signal between the microphone 164 and the speaker 165 in accordance with the control by the CPU 151, a display I/F 167 configured to transmit image data to an external display 170 in accordance with the control by the CPU 151, and a bus line 160 such as an address bus and a data bus configured to electrically connect the units as illustrated in FIG. 2.

The recording medium 156 is removable from the communication terminal 10. Without being limited to the flash memory 154, an electrically erasable and programmable ROM (EEPROM), for example, may be used as long as the memory is a non-volatile memory configured to read or write data in accordance with the control by the CPU 151. Furthermore, the CMOS 162 is a solid-state imaging element configured to convert light into electric charges to obtain an electronic image (video) of a subject, and is not limited to a CMOS as long as a subject can be imaged. A charge coupled device (CCD), for example, may be used. The display 170 is configured by a liquid crystal display or an organic EL display configured to display subject images and operation icons, for example.

Figure 3:
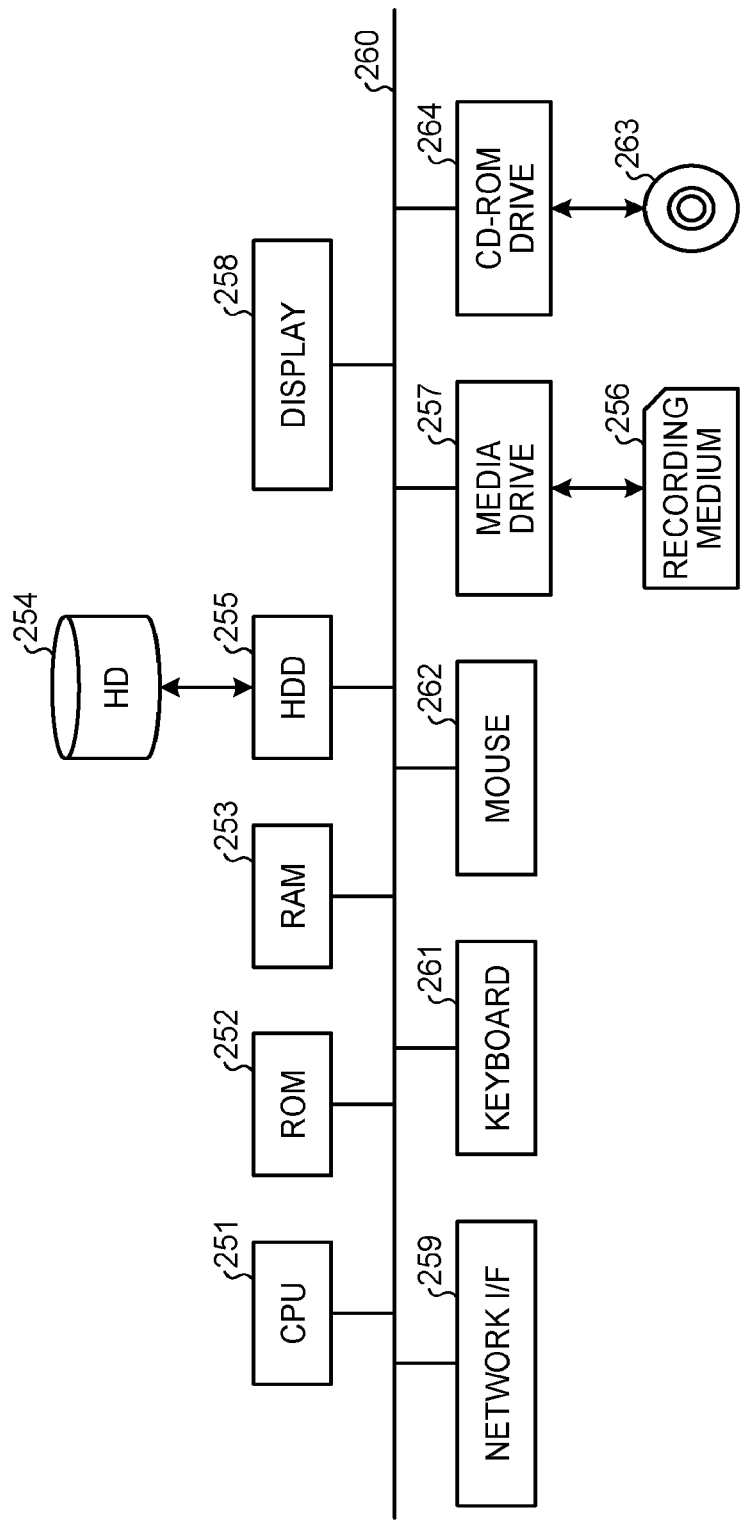
FIG. 3 is a diagram illustrating an example of a hardware structure of each device in a communication management system.

FIG. 3 is a diagram illustrating an example of hardware structures of the devices (communication request distribution device 21, load balancing control device 22, communication management server 23, and log upload server 24) in the communication management system 20. The communication request distribution device 21, load balancing control device 22, the communication management server 23, and the log upload server 24 have substantially the same hardware structure. FIG. 3 illustrates an example of these hardware structures. The hardware structure is not limited to the one including all of these units.

Each device includes a CPU 251 for controlling the overall operation of the device in each device, a ROM 252 that stores a program for each device, a RAM 253 used as a work area of the CPU 251, a hard disk (HD) 254 that stores various kinds of data, a hard disk drive (HDD) 255 for controlling reading or writing of various kinds of data to or from the HD 254 in accordance with the control by the CPU 251, a media drive 257 for controlling reading or writing (storing) of data to or from a recording medium 256 such as a flash memory, a display 258 for displaying various kinds of information such as a cursor, a menu, windows, characters, and images, a network I/F 259 used for data transmission including reception of various kinds of data such as conference information d1 and terminal log information d2, a keyboard 261 provided with a plurality of keys for inputting characters, numerical values, and various kinds of instructions, a mouse 262 used to select and execute various kinds of instructions, select processing targets, and move a cursor, a CD-ROM drive 214 for controlling reading or writing of data to or from a compact disc read only memory (CD-ROM) 263 as an example of a removable recording medium, and a bus line 260 such as an address bus and a data bus for electrically connecting the units as illustrated in FIG. 3.

In the following, when referring to hardware of the devices (communication request distribution device 21, load balancing control device 22, communication management server 23, and log upload server 24), all the devices use the hardware structure illustrated in FIG. 3.

Functional Configurations in Embodiments

Next, functional configurations of the communication terminal 10 and the communication management system 20 will be described.

Functional Configuration of Communication Terminal 10

Figure 4:
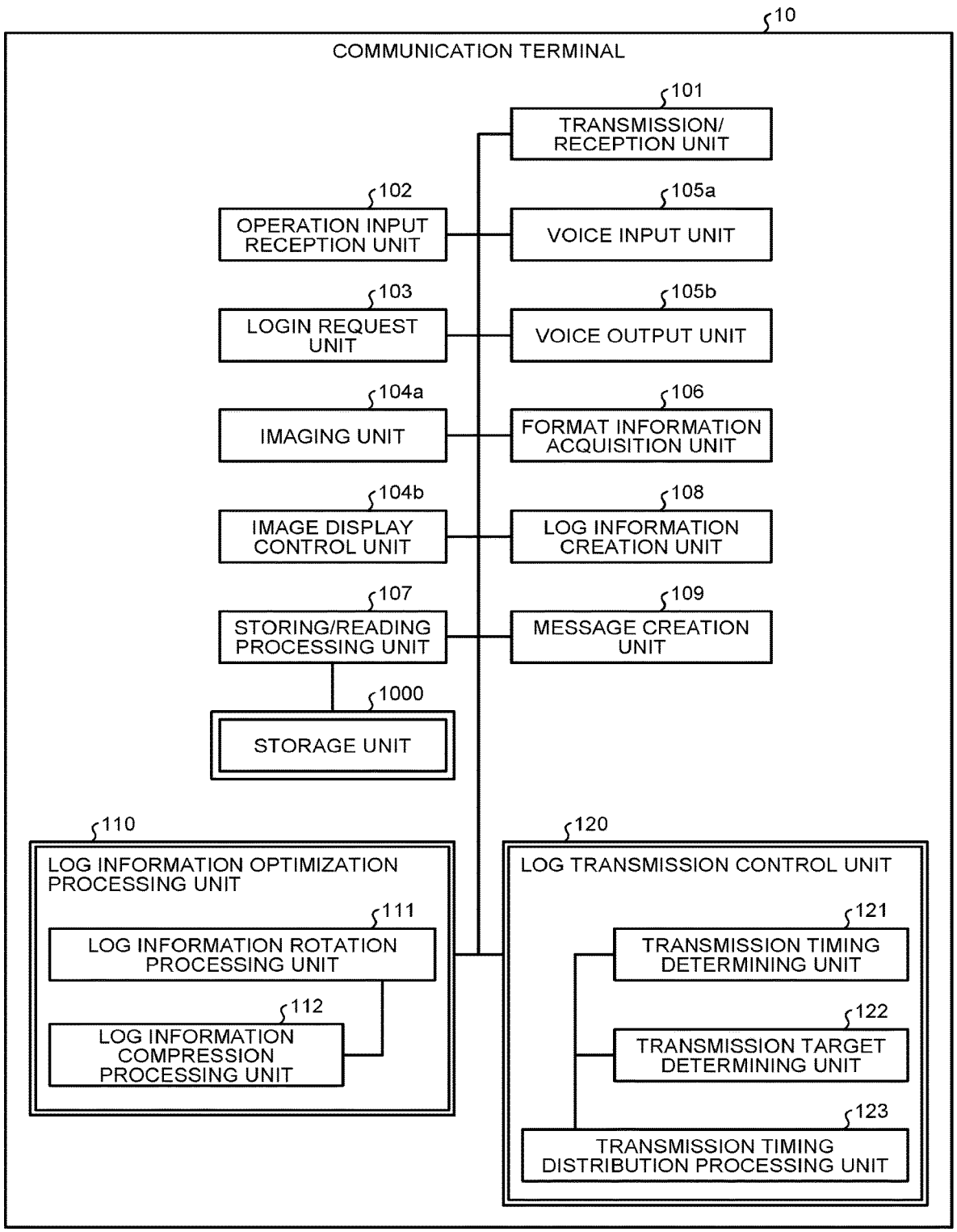
FIG. 4 is a diagram illustrating an example of configurations of functional blocks in the communication terminal.

FIG. 4 is a diagram illustrating an example of a configuration of functional blocks in the communication terminal 10. The communication terminal 10 includes a transmission/reception unit 101, an operation input reception unit 102, a login request unit 103, an imaging unit 104a, an image display control unit 104b, a voice input unit 105a, a voice output unit 105b, a format information acquisition unit 106, a storing/reading processing unit 107, a log information creation unit 108, and a message creation unit 109. The communication terminal 10 further includes a log information optimization processing unit 110 and a log transmission control unit 120. The transmission/reception unit 101, the message creation unit 109, and the log transmission control unit 120 mainly correspond to the "transmitter". The storing/reading processing unit 107 and a storage unit 1000 mainly correspond to the "storage". The log information creation unit 108 corresponds to the "generator". The log information optimization processing unit 110 corresponds to the "optimizer".

Each unit is implemented by the CPU 151 reading and executing a computer program stored in the ROM 152. Each unit appropriately uses the storage unit 1000 such as the flash memory 154 illustrated in FIG. 2 through the storing/reading processing unit 107.

Functional Units in Communication Terminal 10

Next, functional blocks in the communication terminal 10 illustrated in FIG. 4 will be described in detail. The transmission/reception unit 101 in the communication terminal 10 transmits and receives various kinds of data (information) to and from the devices in the communication system 1 through the network I/F 161 illustrated in FIG. 2. The operation input reception unit 102 receives various kinds of inputs from a user through the operation button 158 and the power switch 159 illustrated in FIG. 2. For example, when the user turns on the power switch 159 illustrated in FIG. 2, the operation input reception unit 102 illustrated in FIG. 4 turns on the power in response to the powering-on.

In response to the reception of the powering-on, the login request unit 103 automatically transmits login request information indicating a request for login and the current IP address of the communication terminal 10 from the transmission/reception unit 101 to the communication management system 20.

The imaging unit 104a images a subject by the CMOS 162 and the imaging element I/F 163 illustrated in FIG. 2, and outputs image data obtained by the imaging. The image display control unit 104b performs control for transmitting the image data to the external display 170 through the display I/F 167 illustrated in FIG. 2. The voice input unit 105a inputs voice of the user through the microphone 164 and the voice input/output I/F 166 illustrated in FIG. 2, and converts the voice into a voice signal to output voice data related to the voice signal. The voice output unit 105b converts the voice signal related to the voice data into voice and outputs the voice through the speaker 165 and the voice input/output I/F 166 illustrated in FIG. 2.

The format information acquisition unit 106 acquires format information registered in the storage unit 1000.

The storing/reading processing unit 107 stores various kinds of data in the storage unit 1000, and reads various kinds of data stored in the storage unit 1000.

The log information creation unit 108 creates log information based on contents of operation received by the operation input reception unit 102 when communicating with another communication terminal and contents of processing performed by each unit in the communication terminal 10. The log information creation unit 108 selects a format acquired by the format information acquisition unit 106 from among a plurality of formats, and creates log information in the selected format. Specifically, the log information creation unit 108 creates log information having timestamps in chronological order based on operation contents communicated between a local communication terminal and another communication terminal and processing contents in the local communication terminal in the form of log files, and accumulates the log files in the storage unit 1000. Detailed contents of the log information are described in detail with reference to FIG. 6.

The message creation unit 109 creates a message including a communication terminal ID for identifying the local communication terminal in a format that is interpreted by the log upload server 24. The format interpreted by the log upload server 24 is a format conforming to a communication protocol used for communication between the log upload server 24 and the local communication terminal 10, and is determined in advance by a communication terminal program. As the communication protocol, a communication protocol standardized by Internet Engineering Task Force is preferably used, and an Extensible Messaging and Presence Protocol (XMPP) is exemplified. In the present embodiment, the message means a message for transmitting the fact that at least the terminal log information d2 is included in the transmission data to the transmission destination. Contents of the message are described in detail with reference to FIG. 7.

The log information optimization processing unit 110 optimizes a log file for uploading. In the log information optimization processing unit 110, a log information rotation processing unit 111 manages generations by performing file rotation of log files in the storage unit 1000. A log information compression processing unit 112 compresses the log files subjected to the file rotation. The log files are optimized as terminal log information d2 to be uploaded. The log information rotation processing unit 111 corresponds to a file rotation module. The log information compression processing unit 112 corresponds to the "compressor". A specific method for the file rotation and a compression method are described in detail with reference to FIG. 8.

The log transmission control unit 120 controls transmission timing of the terminal log information d2. In the log transmission control unit 120, a transmission timing determining unit 121 determines the transmission timing of the terminal log information d2 from the state of the local communication terminal.

The transmission timing is a predetermined timing for uploading the terminal log information d2. In the present embodiment, the transmission timing is based on a determination as to whether a predetermined condition is satisfied. Definition information on the predetermined condition is stored in advance in a storage unit such as the flash memory 154. The predetermined condition may be set by a setter configured to display a UI screen on the display 170 and receive settings.

Figure 5:
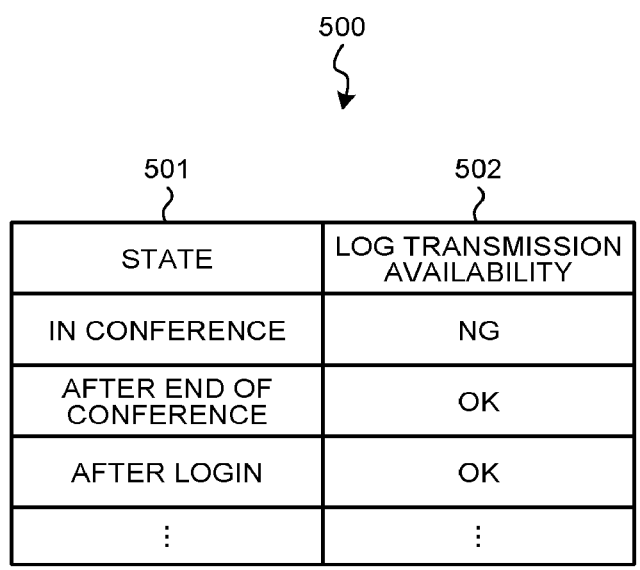
FIG. 5 is a diagram illustrating an example of definition information.

FIG. 5 is a diagram illustrating an example of definition information. In definition information 500 illustrated in FIG. 5, conditions indicating each state 1001 of the local communication terminal and log transmission availability 501 are associated. In the definition information 500, a condition that transmission during a teleconference (while conference information such as voice and/or video is being transmitted) is "NG", a condition that transmission after the end of a teleconference is "OK", and a condition that transmission immediately after login after upon powering-on is "OK" are defined as an example. These conditions are illustrative, and the conditions are not limited thereto. For example, at least one of the conditions may be defined, a timing at which transmission is "OK" in a teleconference may be defined, and another condition may be defined.

A transmission target determining unit 122 corresponds to the "determiner". The transmission target determining unit 122 determines a transmission target from among the optimized log files, that is, the terminal log information d2. When transmission of the transmission target succeeds, the transmission target determining unit 122 sets information representing that the terminal log information d2 to be transmitted has already been transmitted to a management table in the storage unit 1000.

A transmission timing distribution processing unit 123 provides a time lag until the start of transmission of a transmission target when abnormal occurrence of requests has occurred, such as simultaneous transmission from the communication terminals 10.

Log Information

FIG. 6 is a diagram illustrating an example of log information created by the log information creation unit 108. In FIG. 6, log information created in the JSON format is illustrated. In log information 2000 illustrated in FIG. 6, in the item "type", information for identifying whether the log information has been transmitted during "request" indicating a request or received during "response" indicating a response between the communication terminal 10 and another communication terminal 10 is recorded.

In the item "Call-ID", identification information for identifying communication with the other communication terminal 10 is recorded.

In the item "Command", an input request received by the operation input reception unit 102 is recorded, and information such as "invite" for requesting the start of communication or "end" for requesting the end of communication is recorded.

In the item "Result", information indicating allowance or information indicating non-allowance is recorded as a response content from the other communication terminal 10 or a response content to the other communication terminal 10.

Transmission Data

FIG. 7 is a diagram illustrating an example of transmission data 2200 created by the message creation unit 109. The message creation unit 109 creates the transmission data 2200 by including terminal log information d2 that has been optimized by the log information optimization processing unit 110 and determined by the log transmission control unit 120 to be transmitted in a predetermined location.

In the example illustrated in FIG. 7, the transmission data 2200 includes log information 200 created in the JSON format and a message 2100 created in the XML format in accordance with Request for Comments (RFC) 3921, which is one of XMPP. For example, a request transmission destination of any one of conference information d1 and terminal log information d2 is set to the message 2100. The communication request distribution device 21 is able to determine the request type. A communication terminal program and a communication management program define that log information is included in a "<body>" tag, which is a child node of a "<message>" tag in transmission data. Thus, the log upload server 24 that has received the transmission data 2200 in FIG. 7 can grasp that log information is included in the "<body>" tag. According to RFC 3921, any character can be recorded in the "<body>" tag, and hence in FIG. 7, log information is included in the "<body>" tag. The method for including the log information 2000 in the transmission data 2200 is not particularly limited as long as the method conforms to a communication protocol supporting the log upload server 24.

Automatic Upload Function

Figure 8:
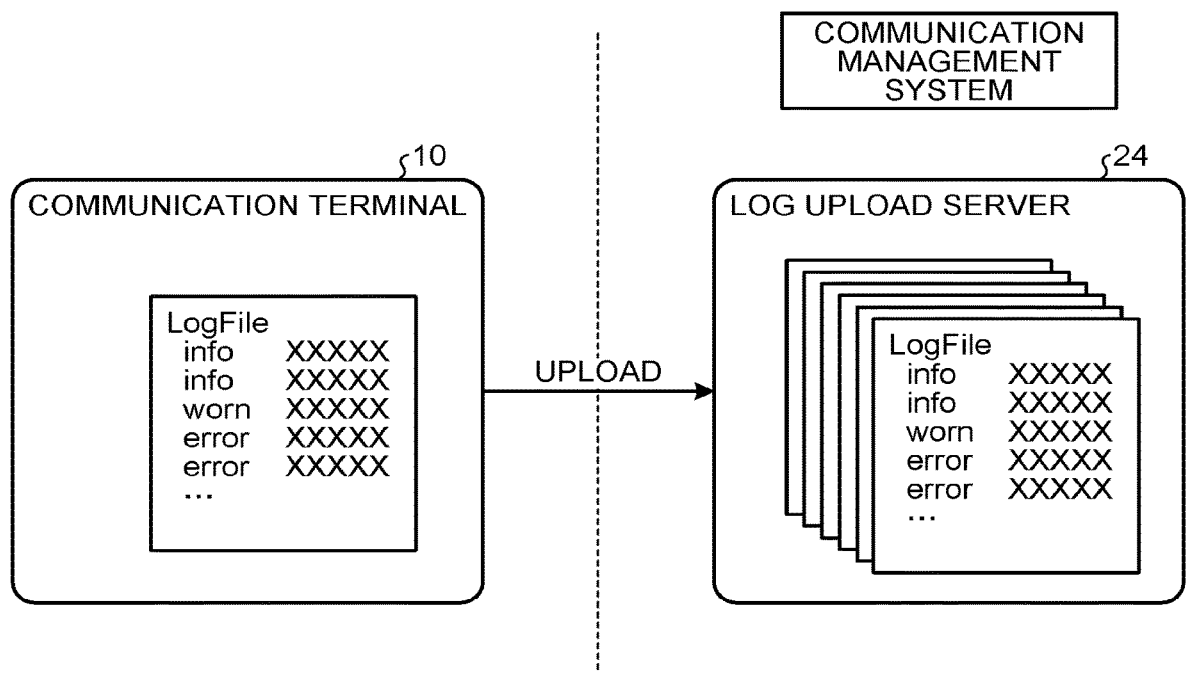
FIG. 8 is a schematic diagram for describing an automatic log upload function.

FIG. 8 is a schematic diagram for describing an automatic log upload function. The communication terminal 10 stores log information in the form of log files and performs file rotation by the log information rotation processing unit 111. The file rotation is performed with reference to a prescribed value (upper limit value). Examples of the prescribed value include the upper limit file size (for example, 1 MB) and a switching period (for example, every day, every week, and every month) for file rotation, and the storage unit 1000 (such as flash memory 154) stores the prescribed value in advance. For example, when log writing of log information to a log file has exceeded the prescribed value, the log information rotation processing unit 111 performs file rotation until the maximum setting of the number of log file generations.

The log information rotation processing unit 111 performs generation management of log files segmented by the file rotation based on generation information (first generation, second generation, . . . ) in a management table, and when the number of generations exceeds the maximum number of generations for file rotation, deletes log files of older generations in order.

The log information compression processing unit 112 optimizes the log files by performing compression processing on log files of old generations among the segmented log files obtained by the log rotation. The latest log information is stored in the form of log files, and hence the log information is compressed when the log information is to be transmitted.

As a compression algorithm of the compression processing, for example, a known technology such as ZIP and TAR is used. The compression algorithm is not limited thereto. As the compression algorithm, any compression algorithm can be used.

In the communication terminal 10 in FIG. 8, one piece of terminal log information d2 segmented by file rotation and compressed is indicated. Each terminal log information d2 is transmitted to the log upload server 24 in the communication management system 20 at a predetermined timing. The terminal log information d2 is sequentially received by the log upload server 24, and a support center deals with a failure based on the terminal log information d2 uploaded to the log upload server 24.

Functional Configuration of Communication Management System 20

Functional Configuration of Communication Request Distribution Device 21

Figure 9:
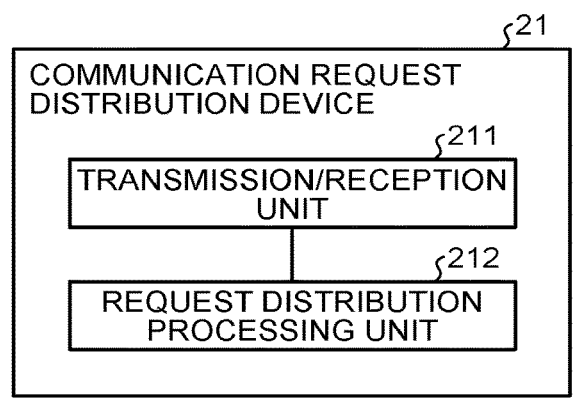
FIG. 9 is a diagram illustrating an example of configurations of functional blocks in a communication request distribution device.

FIG. 9 is a diagram illustrating an example of configurations of functional blocks in the communication request distribution device 21. As illustrated in FIG. 9, the communication request distribution device 21 includes a transmission/reception unit 211 and a request distribution processing unit 212.

The transmission/reception unit 211 transmits and receives various kinds of requests. The request distribution processing unit 212 distributes requests of conference information d1 and terminal log information d2 to devices. The processing of distribution to the devices is performed by the communication request distribution device 21 based on distribution setting definition information stored in a storage unit such as the HD 254. The distribution setting definition information is definition information in which the request type and a request transmission destination are associated with each other. In the present embodiment, a request whose request type is conference information d1 is associated with a load balancing control device 22 in a server group of communication management servers 23 as a request transmission destination. A request whose request type is terminal log information d2 is associated with a load balancing control device 22 in a server group of log upload servers 24 as a request transmission destination. The two types of distribution destinations are indicated in the present embodiment, but the distribution destinations are not limited to the two types. Another variation may be defined in the distribution setting definition information.

Functional Configuration of Load Balancing Control Device 22

Figure 10:
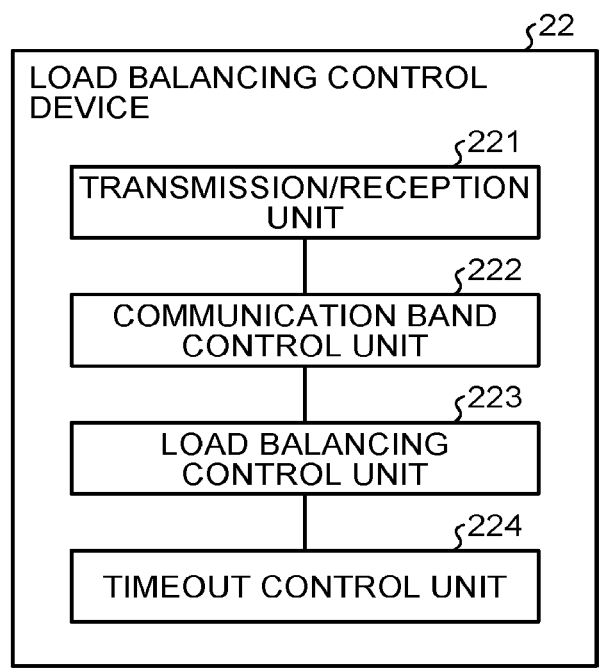
FIG. 10 is a diagram illustrating an example of configurations of functional blocks in a load balancing control device.

FIG. 10 is a diagram illustrating an example of configurations of functional blocks in the load balancing control device 22. As illustrated in FIG. 10, the load balancing control device 22 includes a transmission/reception unit 221, a communication band control unit 222, a load balancing control device 223, and a timeout control unit 224.

The transmission/reception unit 221 transmits and receives various kinds of requests.

The communication band control unit 222 limits the communication band. For example, when the load balancing control device 22 calculates the current total traffic in the communication band and the calculated total traffic exceeds a given traffic, the communication band control unit 222 blocks the transmission of requests to the load balancing control device 223 until the total traffic becomes equal to or smaller than the given traffic (becomes standby state). The determination as to whether the total traffic is equal to or smaller than a given traffic is performed based on a communication band limitation setting value stored in a storage unit such as the HD 254 in the load balancing control device 22.

The load balancing control device 223 performs load balancing control for transmitting requests by distributing the requests to servers in a group in order to distribute load of the servers in the group. As a distribution algorithm, for example, an algorithm of sequential distribution (round robin) can be used. Other than that, an algorithm for preferentially distributing requests to a server having small CPU load or memory load among the servers may be used. These algorithms are example. The distribution algorithm is not limited thereto, and another algorithm may be used.

The timeout control unit 224 performs timeout control when a request is transmitted to a distribution destination server. In the timeout control, an error is returned to the communication request distribution device 21 or the communication terminal 10 when a response to a request transmitted to the server has not been received in a predetermined period.

Functional Configuration of Communication Management Server 23

Figure 11:
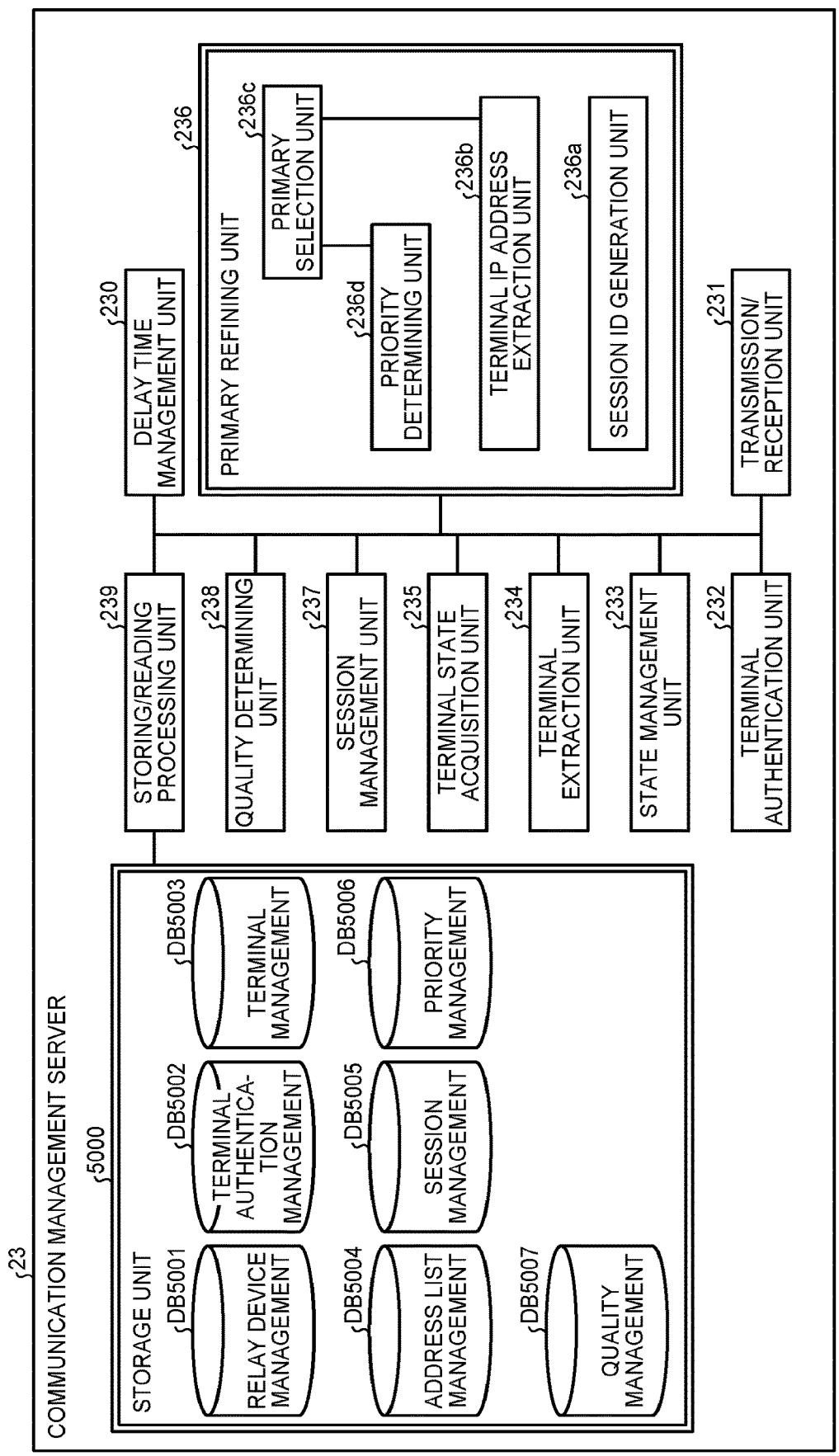
FIG. 11 is a diagram illustrating an example of configurations of functional blocks in a communication management server.

FIG. 11 is a diagram illustrating an example of configurations of functional blocks in the communication management server 23. As illustrated in FIG. 11, the communication management server 23 includes a transmission/reception unit 231, a terminal authentication unit 232, a state management unit 233, a terminal extraction unit 234, a terminal state acquisition unit 235, a primary refining unit 236, a session management unit 237, a quality determining unit 238, a storing/reading processing unit 239, and a delay time management unit 230. Each unit is implemented by the CPU 251 reading and executing a computer program stored in the ROM 252. The communication management server 23 further includes a storage unit 5000. In the storage unit 5000, various kinds of databases (relay device management database 5001, terminal authentication management database 5002, terminal management database 5003, address list management database 5004, session management database 5005, priority management database 5006, and quality management database 5007) stored in the HD 254 are indicated.

For example, the table configurations of various kinds of databases are as follows. In a relay device management table, the operating state of a relay device, the date and time at which the communication management server 23 received state information indicating the operating state, the IP address of the relay device, and the maximum data transmission speed (Mbps) in the relay device are associated with one another for each relay device ID of relay devices.

In a terminal authentication management table, a password is associated with each terminal ID of all communication terminals 10 managed by the communication management server 23.

In a terminal management table (DB 5003 in FIG. 11), the terminal name, the operating state of each communication terminal 10, the date and time at which the communication management server 23 received login request information, and the IP address of the communication terminal 10 are associated with one another for each terminal ID of communication terminals 10.

Figures 12, 13:
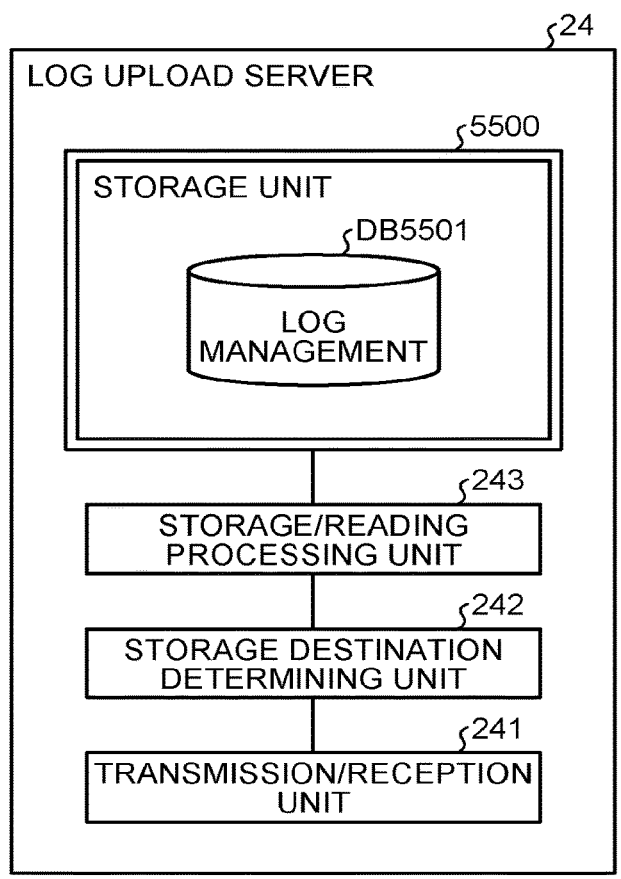
FIG. 12 is a diagram illustrating an example of terminal information on communication terminals managed in a terminal management table.
FIG. 13 is a diagram illustrating an example of a configuration of functional blocks in a log upload server.

FIG. 12 is a diagram illustrating an example of terminal information on the communication terminal 10 managed by the terminal management table. The terminal information also manages the communication terminal itself. In a terminal management table 6000, a terminal name 6001 is the name set to the communication terminal. An operating state 6002 of the terminal is updated as necessary depending on the state of the terminal. In an address list management table, all terminal IDs of terminals registered as candidates of an address terminal are associated with a terminal ID of a request source terminal that requests the start of a teleconference. The candidates of the address terminal are added or deleted by a request of addition or deletion from the request source terminal to the communication management server 23.

In a session management table, a relay device ID of a relay device used to relay image data and voice data, a terminal ID of a request source terminal, a terminal ID of an address terminal, a delay time (ms) of reception of image data in the address terminal, and the date and time at which the communication management server 23 received delay information indicating the delay time from the address terminal are associated with one another for each session ID for uniquely identifying a session where call data is communicated between terminals. In the case where a teleconference is performed between two communication terminals 10, the reception date and time of the delay information may be managed based on the delay information transmitted from the request source terminal rather than from the address terminal. In the case where a teleconference is performed among three or more terminals 10, the reception date and time of the delay information is managed based on the delay information transmitted from a terminal 10 that has received image data and voice data.

In an address priority management table, any communication terminal 10 and any relay device are associated such that a point of address priority becomes higher depending on whether four pairs of dot addresses (Dot Address) of IP addresses in general IPv4 are identical or different. For example, IP addresses having the same three values from upper to lower digits of dot addresses have a point of address priority of "5". IP addresses having the same two values from upper to lower digits of dot addresses have a point of address priority of "3". In this case, the priority is not influenced depending on whether or not the values of the least significant dot addresses are the same. IP addresses having the same value of the most significant bit and different second highest values of dot addresses have a point of address priority of "1". In this case, the priority is not influenced depending on whether or not the values of the third highest and least significant dot addresses are the same. IP addresses having different values of the most significant dot addresses have a point of address priority of "0". In this case, the priority is not influenced depending on whether or not the values of the second and third highest and least significant dot addresses are the same does not have influence on the priority.

In a transmission speed priority management table, a relay device and a transmission speed priority are managed in association with each other such that a point of transmission speed priority becomes higher depending on the value of the maximum data transmission speed (Mbps) in the relay device. For example, when the maximum data transmission speed in the relay device is 1,000 Mbps or more, the point of transmission speed priority is "5". When the maximum data transmission speed in the relay device is 100 Mbps or more and less than 1,000 Mbps, the point of transmission speed priority is "3". When the maximum data transmission speed in the relay device is 10 Mbps or more and less than 100 Mbps, the point of transmission speed priority is "1". When the maximum data transmission speed in the relay device is less than 10 Mbps, the point of transmission speed priority is "0".

In a quality management table, the image quality (quality of image) of image data to be relayed by the relay device is associated depending on a delay time (ms) of image data in a request source terminal or an address terminal.

Functional Units in Communication Management Server 23

Next, functional units in the communication management server 23 will be described in detail. The transmission/reception unit 231 transmits and receives various kinds of data (or information) to and from another terminal, device, or system through the network I/F 259 illustrated in FIG. 3. The terminal authentication unit 232 searches a terminal authentication management table in the storage unit 5000 by using a terminal ID and a password included in login request information received through the transmission/reception unit 231 as a search key, and determines whether the same terminal ID and password are managed in the terminal authentication management table to authenticate the terminal. The state management unit 233 manages the operating state of a request source terminal that has made a login request. Specifically, the state management unit 233 manages, in a terminal management table in the storage unit 5000, the terminal ID of the request source terminal, the operating state of the request source terminal, the date and time of login request information received by the communication management server 23, and the IP address of the request source terminal in association with one another.

The terminal extraction unit 234 searches an address list management table in the storage unit 5000 by using the terminal ID of the request source terminal that has made a login request as a key, and reads a terminal ID of a candidate of an address terminal that can communicate with the request source terminal to extract the terminal ID. The terminal extraction unit 234 searches the address list management table to extract terminal IDs of other request source terminals for which the terminal ID of the request source terminal has been registered as a candidate of the address terminal.

The terminal state acquisition unit 235 searches the terminal management table in the storage unit 5000 by using the terminal ID of the candidate of the address terminal extracted by the terminal extraction unit 234 as a search key, and reads the operating state for each terminal ID extracted by the terminal extraction unit 234. In this manner, the terminal state acquisition unit 235 can acquire operating states of the candidates of the address terminal that can communicate with the request source terminal that has made a login request. The terminal state acquisition unit 235 searches the terminal state management table in the storage unit 5000 by using the terminal ID as a search key, and acquires the operating state of the request source terminal that has made a login request.

The primary refining unit 236 performs primary refining processing as processing for assisting final refining processing for finally refining to one relay device from a plurality of relay devices. The primary refining unit 236 includes a session ID generation unit 236a, a terminal IP address extraction unit 236b, a primary selection unit 236c, and a priority determining unit 236d.

The session ID generation unit 236a generates a session ID for uniquely identifying a session where call data is communicated between terminals. The terminal IP address extraction unit 236b searches the terminal management table in the storage unit 5000 based on the terminal ID of the request source terminal included in start request information transmitted from the request source terminal and the terminal ID of the address terminal, thereby extracting an IP address of the corresponding communication terminal 10.

The primary selection unit 236c selects a relay device by selecting a relay device ID of a relay device whose operating state is "ON line" from among relay devices managed in a relay device management table in the storage unit 5000. The primary selection unit 236c searches the relay device management table based on the IP address of the request source terminal and the IP address of the address terminal extracted by the terminal IP address extraction unit 236b to examine, for each dot address of the IP address of the selected relay device, whether the dot address is the same as or different from dot addresses of the IP addresses of the request source terminal and the address terminal. The primary selection unit 236c selects relay devices having the highest and second highest integration points among integration points obtained by integrating, for each relay device, a higher point for the communication terminal 10 in points of address priority and a point of transmission speed priority, thereby further selecting relay devices.

In the present embodiment, the relay devices having the highest and second highest points are selected. The embodiment is not limited thereto, and three or more relay devices having higher points may be selected as long as a larger number of the relay devices can be narrowed down.

The priority determining unit 236d refers to a priority management table in the storage unit 5000 to determine a point of address priority for each relay device examined by the primary selection unit 236c. The priority determining unit 236d searches a transmission speed priority management table based on the maximum data transmission speed of each relay device stored in the relay device management table, and determines a point of transmission speed priority for each relay device narrowed down by the primary selection unit 236c.

The session management unit 237 manages the session ID generated by the session ID generation unit 236a, the terminal ID of the request source terminal, and the terminal ID of the address terminal in association with one another in the session management table in the storage unit 5000. The session management unit 237 manages, for each session ID, a relay device ID of one relay device finally selected by a final selection unit in the communication terminal 10 in the session management table.

The quality determining unit 238 searches the quality management table in the storage unit 5000 by using the above-mentioned delay time as a search key, and extracts image quality of corresponding image data to determine the image quality of image data to be relayed by the relay device. The storing/reading processing unit 239 performs reading processing and writing processing of various kinds of data (data such as tables) stored in the storage unit 5000 by using the HDD 255 illustrated in FIG. 3. The delay time management unit 230 searches the terminal management table in the storage unit 5000 by using the IP address of the address terminal as a search key to extract a corresponding terminal ID, and stores and manages a delay time indicated by the above-mentioned delay information in the session management table in a field of delay time in a record including the extracted terminal ID.

Functional Configuration of Log Upload Server 24

FIG. 13 is a diagram illustrating an example of configurations of functional blocks in the log upload server 24. As illustrated in FIG. 13, the log upload server 24 includes a transmission/reception unit 241, a storage destination determining unit 242, and a storage/reading processing unit 243. Each unit is implemented by the CPU 251 reading and executing a computer program stored in the ROM 252. The log upload server 24 further includes a storage unit 5500. In the storage unit 5500, a log management database 5501 stored in the HD 254 is indicated.

In a log management table in the log management database 5501, a log ID for identifying terminal log information d2, terminal log information d2, a session ID, and time management information are associated for each terminal ID of the communication terminal 10. The terminal log information d2 may include information such as "invite" for requesting the start of a session of communication between terminals, "bye" for notifying the end of the session, "login" for requesting login to the communication management system 20, "logout" for requesting logout from the communication management system 20, and "cancel" for canceling a request. The time management information is information indicating a time to be managed in association with each terminal log information d2.

Functional Units in Log Upload Server

Next, functional units in the log upload server 24 will be described in detail. The transmission/reception unit 241 transmits and receives various kinds of data (information) to and from another terminal, device, or system through the network I/F 259 illustrated in FIG. 3. The storage destination determining unit 242 distributes storage destinations to different internal databases depending on the type of terminal log information d2 when storing the terminal log information d2 in the log management database 5501. The storage/reading processing unit 243 uses the HDD 255 illustrated in FIG. 3 to perform reading processing and writing processing of various kinds of data (data such as tables) stored in the storage unit 5500.

Processing Flows in Devices

Next, processing flows in the devices will be described. A transmission processing flow for terminal log information d2 in the communication terminal 10 is first described, and optimization processing of terminal log information d2 to be transmitted is subsequently described.

Figure 14:
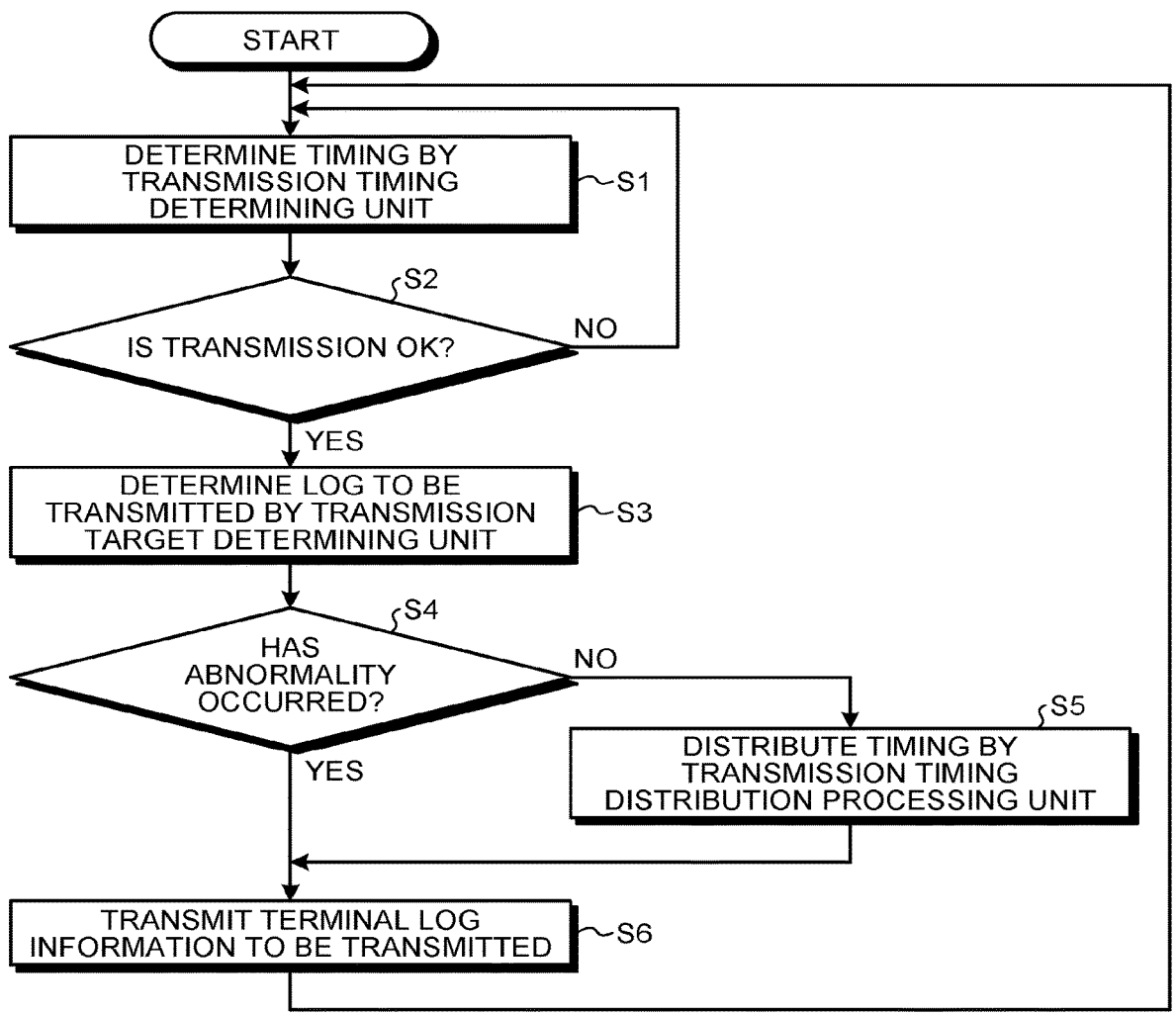
FIG. 14 is a flowchart illustrating an example of terminal log transmission processing in a log transmission control unit in the communication terminal.

FIG. 14 is a flowchart illustrating an example of terminal log transmission processing in the log transmission control unit 120 in the communication terminal 10. First, the log transmission control unit 120 (transmission timing determining unit 121) determines whether the current timing is timing for automatically uploading (transmitting) terminal log information d2 from the state of the communication terminal 10 (Step S1). Details of the determination processing are described later (see FIG. 15).

When the transmission timing determining unit 121 determines that the current timing is not the transmission timing (No at Step S2), the transmission timing determining unit 121 repeatedly performs the determination at Step S1 regularly until the transmission timing is reached.

When it is determined by the transmission timing determining unit 121 that the current timing is the transmission timing (Yes at Step S2), the log transmission control unit 120 (transmission target determining unit 122) subsequently determines terminal log information d2 to be transmitted (Step S3). For example, the transmission target determining unit 122 determines an untransmitted part of the minimum terminal log information d2 as log information to be transmitted from among terminal log information d2 optimized by the log information optimization processing unit 110. Details of the processing for optimizing the terminal log information d2 by the log information optimization processing unit 110 are described later (see FIG. 16).

Subsequently, the log transmission control unit 120 (transmission timing determining unit 121) determines whether abnormality has occurred based on whether conferences have been simultaneously ended due to abnormality in communication lines or in the server (Step S4).

When abnormality has occurred (No at Step S4), the log transmission control unit 120 (transmission timing distribution processing unit 123) performs timing distribution processing of transmission timing (Step S5). As the timing distribution processing, for example, the transmission timing distribution processing unit 123 provides a random time lag of 1 to 60 seconds until the start of transmission. The timing distribution processing is described later with reference to a drawing (see FIG. 17).

When abnormality has not occurred (Yes at Step S4), the log transmission control unit 120 performs terminal log information transmission processing for transmitting the transmission target determined at Step S3 to the communication management system 20 (Step S6). After the transmission, the log transmission control unit 120 returns to Step S1 to perform the same processing on the remaining terminal log information that has not yet been transmitted.

Figure 15:
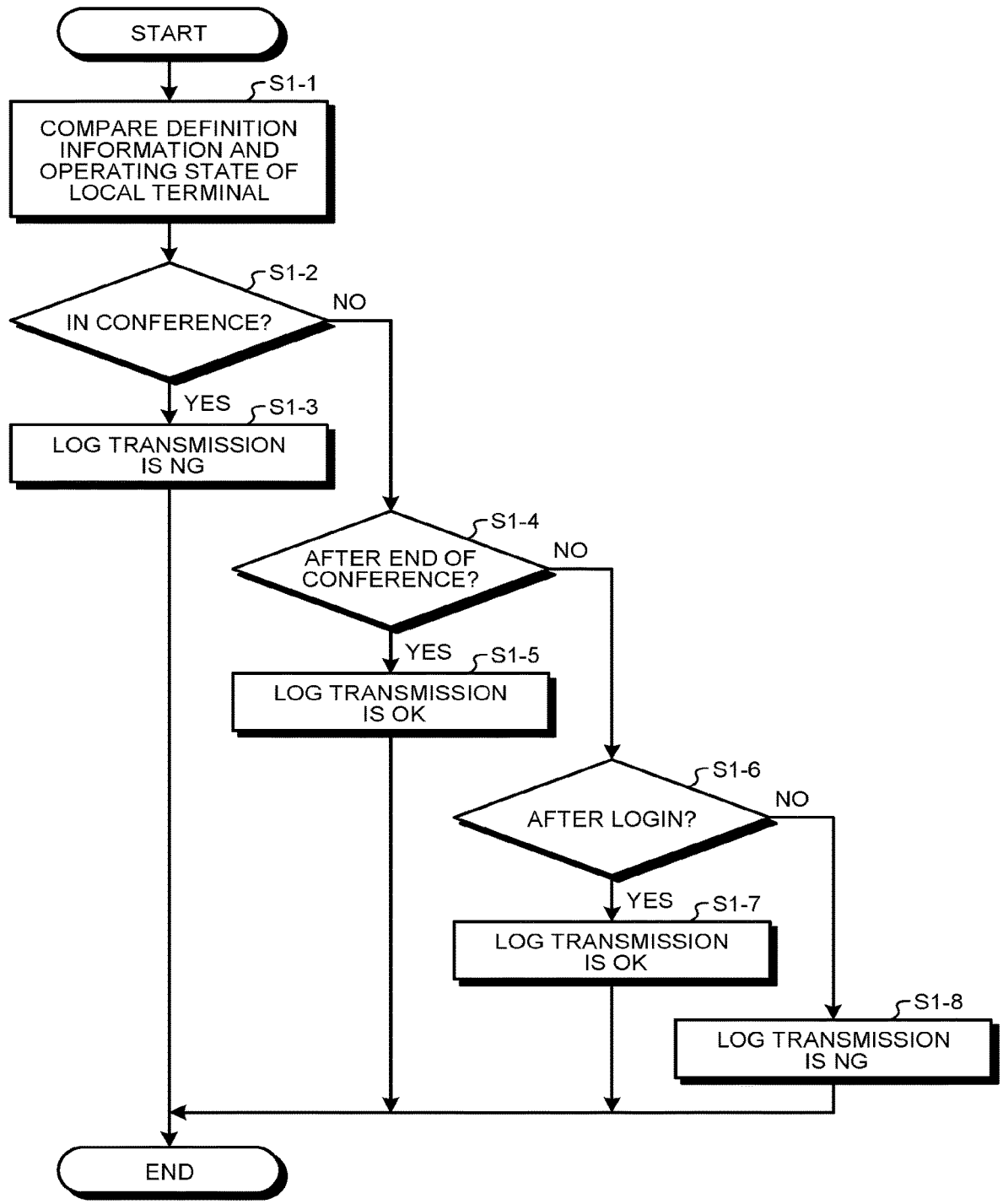
FIG. 15 is a flowchart illustrating an example of timing determination processing performed by a transmission timing determining unit in the communication terminal.

FIG. 15 is a flowchart illustrating an example of timing determination processing performed by the transmission timing determining unit 121 in the communication terminal 10. First, the transmission timing determining unit 121 compares the definition information 500 (see FIG. 5) and the operating state 6002 of the terminal (see FIG. 12) (Step S1-1).

When the operating state 6002 of the terminal is "in conference" (Yes at Step S1-2), the log transmission availability 501 in the definition information 500 is "NG", and hence the transmission timing determining unit 121 determines that the current timing is not a timing for transmitting the terminal log information d2 and thus the transmission should be suspended (Step S1-3). The transmission timing determining unit 121 finishes the determination processing.

When the operating state 6002 of the terminal is not "in conference" (No at Step S1-2) but "after end of conference" (Yes at Step S1-4), the log transmission availability 501 is "OK", and hence the transmission timing determining unit 121 determines OK, that is, the current timing is timing for transmitting the terminal log information d2 (Step S1-5), and finishes the determination processing.

When the operating state 6002 of the terminal is not "after end of conference" (No at Step S1-4) but "after login" (Yes at Step S1-6), the log transmission availability 501 is "OK", and hence the transmission timing determining unit 121 determines OK, that is, the current timing is timing for transmitting the terminal log information d2 (Step S1-7), and finishes the determination processing.

When the operating state 6002 of the terminal is not "after login" (No at Step S1-6), that is, an operating state that matches none of the states in the definition information 500, the transmission timing determining unit 121 determines NG, that is, the current timing is not timing for transmitting the terminal log information d2 (Step S1-8), and finishes the determination processing.

The flow has been described as an example where conditions other than "in conference", "after end of conference", and "after login" are not defined in the log transmission availability 501. In the case where conditions other than these are defined, the transmission timing determining unit 121 determines the timing for the remaining defined conditions similarly to "in conference", "after end of conference", and "after login".

An example where NG is determined for an operating state that does not match any of the definition information 500 has been described, but OK may be determined for the operating state.

Figure 16:
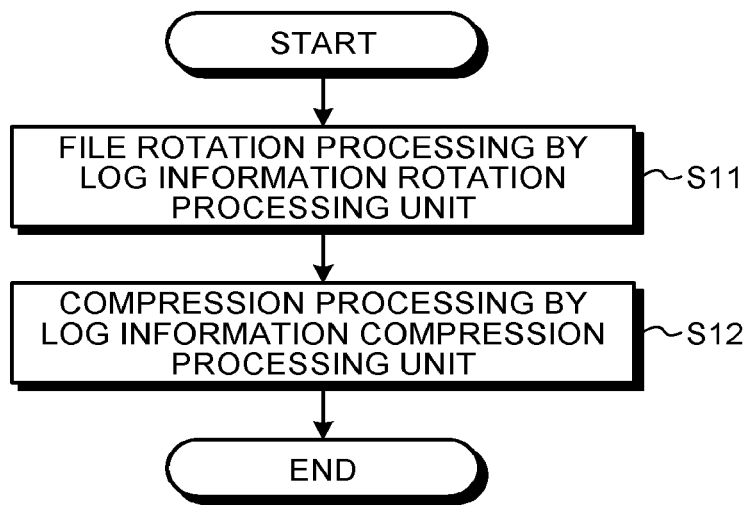
FIG. 16 is a flowchart illustrating an example of optimization processing by a log information optimization processing unit.

FIG. 16 is a flowchart illustrating an example of optimization processing by the log information optimization processing unit 110 in the communication terminal 10. First, the log information optimization processing unit 110 (log information rotation processing unit 111) performs file rotation processing on log information stored in the form of log files (Step S11).

Subsequently, the log information optimization processing unit 110 (log information compression processing unit 112) performs compression processing on log files of old (not latest) generations among the log files segmented after the file rotation (Step S12). In this manner, the log transmission control unit 120 optimizes the log information stored in the form of log files to obtain terminal log information d2.

As described above, in the communication terminal 10, the log information stored in the form of log files is optimized, and the optimized terminal log information d2 is transmitted to the communication request distribution device 21 as a request at a predetermined timing.

Figure 17:
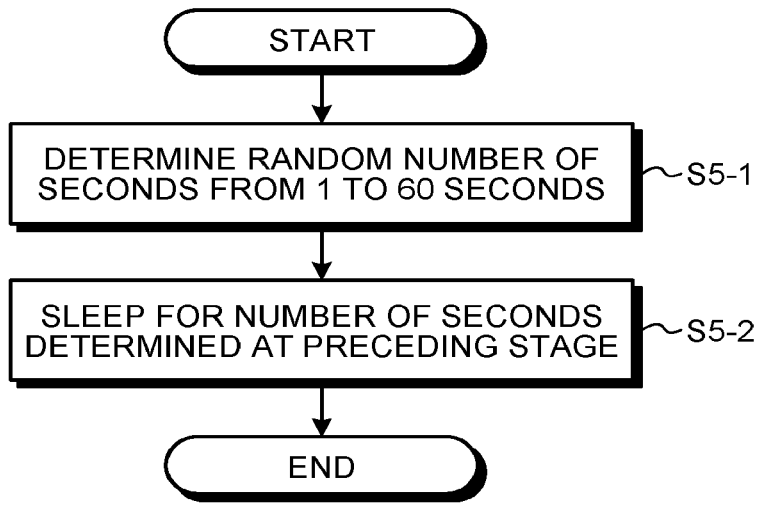
FIG. 17 is a flowchart illustrating an example of timing distribution processing performed by a transmission timing distribution processing unit in the communication device.

FIG. 17 is a flowchart illustrating an example of timing distribution processing performed by the transmission timing distribution processing unit 123 in the communication terminal 10. First, the transmission timing distribution processing unit 123 determines the random number of seconds from 1 to 60 seconds (Step S5-1). The transmission timing distribution processing unit 123 sleeps for the number of seconds determined in the preceding stage, and proceeds to subsequent terminal log information transmission processing (processing at Step S6 in FIG. 14) (Step S5-2).

Figure 18:
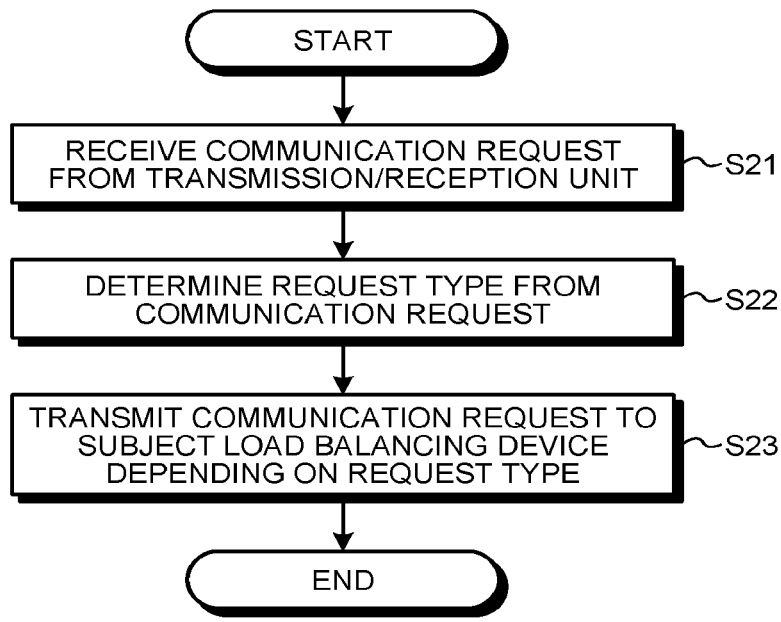
FIG. 18 is a flowchart illustrating an example of request distribution processing in a communication request distribution device.

FIG. 18 is a flowchart illustrating an example of request distribution processing in the communication request distribution device 21. First, the transmission/reception unit 211 receives a request (Step S21). Specifically, the transmission/reception unit 211 receives the transmission data 2200 illustrated in FIG. 7 transmitted from the communication terminal 10 as a request.

Subsequently, the request distribution processing unit 212 determines the request type from the request received by the transmission/reception unit 211, and distributes transmission destinations of the request (Step S22). The request distribution processing unit 212 determines the request type from a request message. Other than that, for example, the request distribution processing unit 212 determines the request type from a request header (for example, Host header) or a request body (contents) of the request or a request path (for example, "/meeting" or "/logupload") of the request. These are examples of an index for determining the request type, and the index is not limited thereto. Another index may be used as appropriate.

Subsequently, the transmission/reception unit 211 transmits a request to a load balancing control device 22 corresponding to the request type (Step S23). Specifically, the transmission/reception unit 211 transmits a request to a transmission destination (load balancing control device 22 corresponding to request type) distributed by the request distribution processing unit 212. For example, when the request type is "conference information", a request is transmitted to a load balancing control device 22 in a server group of communication management servers 23 that manage conference information. When the request type is "terminal log information", a request is transmitted to a load balancing control device 22 in a server group of log upload servers 24 that manage terminal log information.

As described above, the request distribution processing unit 212 performs the distribution processing such that a request is transmitted to a corresponding load balancing control device 22 depending on the type of the request.

Figure 19:
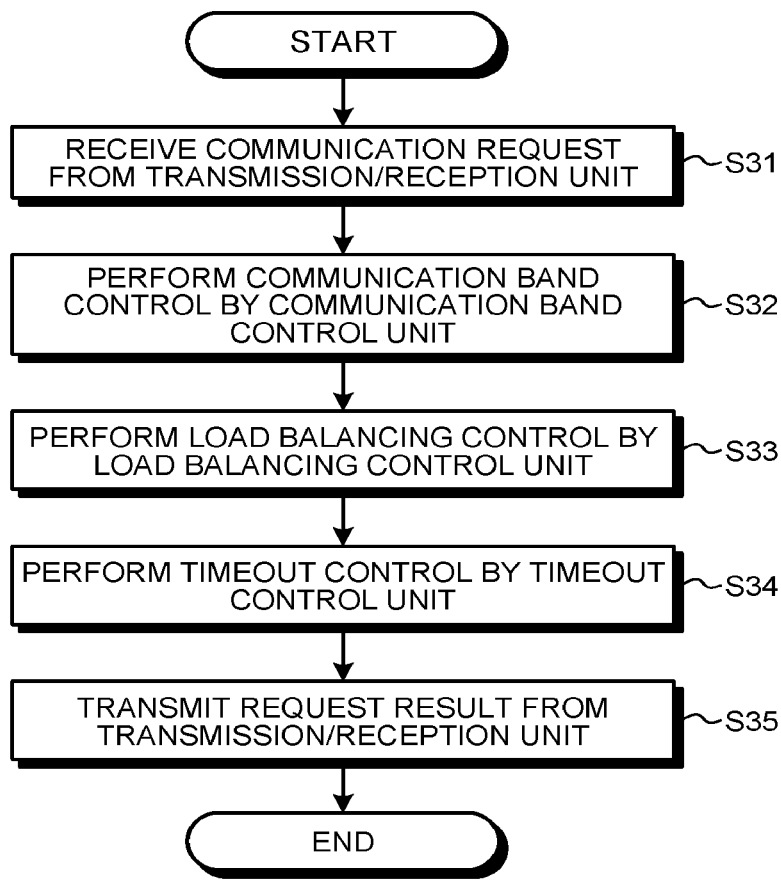
FIG. 19 is a flowchart illustrating an example of load balancing of requests in a load balancing control device.

FIG. 19 is a flowchart illustrating an example of load balancing of requests in the load balancing control device 22. Processing in the load balancing control device 22 in the log upload server 24 is described as an example. The same applies to the load balancing control device 22 in the communication management server 23.

First, the transmission/reception unit 221 receives a request (Step S31). The transmission/reception unit 221 receives the transmission data 2200 illustrated in FIG. 7 as a request from the communication terminal 10 through the communication request distribution device 21.

Subsequently, the communication band control unit 222 performs communication band control for blocking the transmission of the request received from the transmission/reception unit 221 to the load balancing control device 223 (Step S32).

Subsequently, the load balancing control device 223 appropriately distributes and transmits the request to subordinate log upload server(s) 24 (Step S33).

Subsequently, the timeout control unit 224 performs timeout control (Step S34). For example, the timeout control unit 224 determines timeout when a given time has elapsed while waiting for a request result from the log upload server 24. The given time is based on a timeout setting value stored in a storage unit such as the HD 254 in the load balancing control device 22.

Subsequently, the transmission/reception unit 221 transmits a request result (Step S35). For example, when timeout is not determined by the timeout control unit 224, the transmission/reception unit 221 transmits a request result from the log upload server 24 to the communication terminal 10 through the communication request distribution device 21. When timeout is determined by the timeout control unit 224, the transmission/reception unit 221 transmits a request result of a timeout error to the communication terminal 10 through the communication request distribution device 21.

In the present example, the case where a request result is transmitted to the communication terminal 10 through the communication request distribution device 21 has been described. A request result may be transmitted directly to the communication terminal 10 from the load balancing control device 22.

As described above, the load balancing control device 22 limits the communication band and performs load balancing of requests. The load balancing control device 22 returns a request result from a server of a transmission destination of the request to the communication terminal 10, and hence the communication terminal 10 can manage whether the transmission of terminal log information d2 to be transmitted has been completed based on the request result. For example, when an error has been returned as a request result, the communication terminal 10 is able to determine that terminal log information d2 corresponding to the request result has not been transmitted, and manage the untransmitted part of the terminal log information d2 in the management table.

Figure 20:
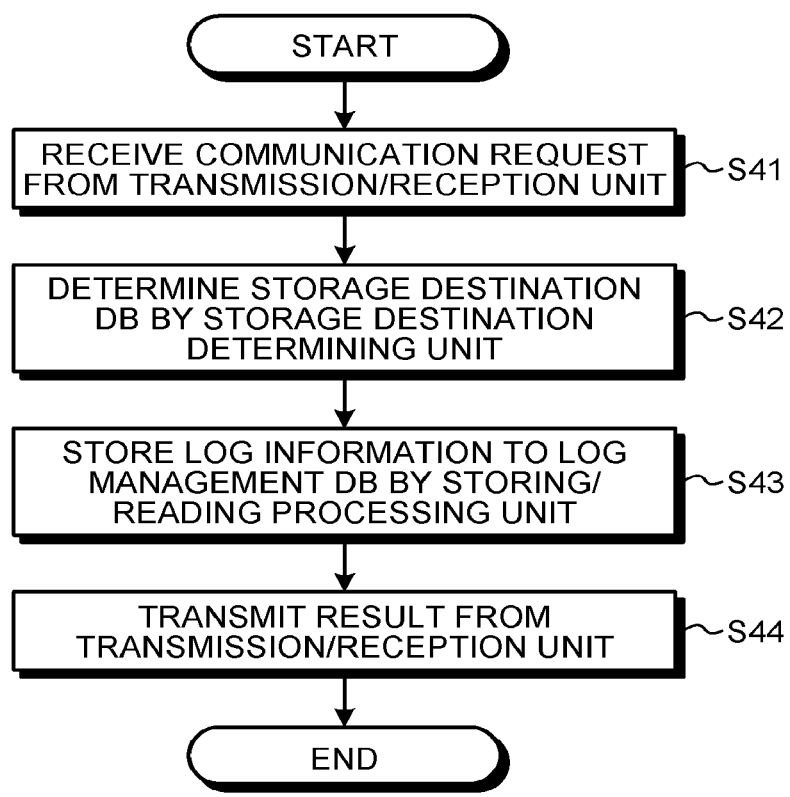
FIG. 20 is a flowchart illustrating an example of processing for storing terminal log information in the log upload server.

FIG. 20 is a flowchart illustrating an example of processing for storing the terminal log information d2 in the log upload server 24. First, the transmission/reception unit 241 receives the transmission data 2200 illustrated in FIG. 7 from the communication terminal 10 through the load balancing control device 22 as a request (Step S41).

Subsequently, the storage destination determining unit 242 determines a storage destination DB (Step S42). Specifically, the storage destination determining unit 242 distributes storage destinations to different internal DBs depending on the type of terminal log information d2 when storing the log information in the log management DB. For example, the storage destination determining unit 242 distributes storage destinations to different internal DBs depending on the value of "Type" in the terminal log information d2. Other than that, the storage destination determining unit 242 distributes storage destinations to different internal DBs depending on the value of "Command" in the terminal log information. Other than that, the storage destination determining unit 242 distributes storage destinations to different internal DBs depending on the value of "Log Level" in the terminal log information d2. These are examples, and another classification of log information may be defined.

Subsequently, the storage/reading processing unit 243 stores the log information in the log management DB (Step S43). Specifically, the storage/reading processing unit 243 stores the terminal log information in a predetermined location in the log management DB determined by the determination at Step S42.

Subsequently, the transmission/reception unit 241 transmits a request result (Step S44). For example, the transmission/reception unit 241 transmits a request result indicating that the terminal log information has been successfully stored to the load balancing control device 22.

It is not necessarily required to include all of the configuration of the communication system, the hardware structure of the devices, and the functional configurations described as an example in the present embodiment, and these may be implemented by a combination of parts of the configuration and/or structure. For example, the communication band control unit 222, the load balancing control device 223, and the timeout control unit 224 in the load balancing control device 22 may be implemented by one of these units or a combination of two of these units.

In the present embodiment, a teleconference has been exemplified as communication using a communication system. The communication is not limited thereto, and a meeting, general communications among family and friends, and one-way presentation of information are included in the communication. For example, the communication system is applicable to electronic commerce (interactive commodity trading) and a bi-directional video distribution terminal (such as Showroom or Niconico). In the present embodiment, conference information (voice and/or video) has been described as an example of communication information, but the communication information is not limited thereto. For example, the communication information may include stroke data (handwriting information) and text data.

Effects in First Embodiment

In the present embodiment, the optimizer is provided. Accordingly, the size of the terminal log information d2 is reduced, and hence the transmission time can be reduced, and the communication line band/processing load on the communication management system 20 can be reduced. The size of the terminal log information d2 is reduced, and hence the transmission of logs can be completed in a short period of time, and a failure due to transmission interruption can be reduced.

In the present embodiment, the load balancing control device 22 distributes requests to a plurality of log upload servers 24, and hence the processing load for the request per log upload server 24 can be reduced to enable requests from a large number of communication terminals 10 to be processed.

In the log upload server 24, different databases (DBs) are used to store log information depending on the type, and hence the load on DB resources can be reduced.

The load balancing control device 22 performs the timeout control, and hence a request can be canceled when it takes time because of requests are congested.

The load balancing control device 22 does not exclusively use the communication line band of terminal log information d2, and hence the degradation of conference quality due to congestion of the communication line band of conference information can be prevented.

In the case where abnormality of requests has occurred, such as simultaneous transmission from communication terminals 10, the transmission timing distribution processing unit 123 performs timing distribution processing for distributing transmission timing. Consequently, terminal log information d2 can be prevented from simultaneously transmitted from a large number of communication terminals 10, and the communication line band and processing load in the communication management system 20 can be prevented from being abruptly increased.

As described above, in the present embodiment, log information can be automatically uploaded without congesting the communication line band used for communication of conference information (communication information).

By combining with features of transmission of untransmitted logs on the communication terminal side, the communication band load/processing load in the communication management system can be reduced while preventing transmission omission of terminal log information.

As described above, the communication line band is not congested, and hence the degradation of conference quality such as image quality in a teleconference can be prevented. In particular, the communication band load/processing load in the communication management system are reduced, and hence the communication line band used for a conference is not congested, and conference quality (video and voice) as the original value of a multi-site conference system can be maintained high. The transmission status of the terminal log information d2 can be managed by the communication terminal 10, and hence log information can be reliably transmitted without omission.

The terminal log information d2 can be automatically reliably collected, which helps in analysis of causes when a trouble occurs in the entire multi-site conference system or the communication terminal 10. The use method of the communication terminal 10 and the tendency of a conference are analyzed from the terminal log information d2, which helps in proposal and improvement of a more convenient function.

First Modification

In the first embodiment, an example has been described, in which log rotation of log files is performed to compress the log files in the communication terminal 10. Terminal log information d2 having been determined as being transmitted may be collectively compressed at the time of transmission.

Second Modification

In the first embodiment, in the communication terminal 10, the minimum terminal log information d2 as an untransmitted part is determined to be transmitted. Some numbers of the latest generations of the terminal log information d2 may be always included in the transmission. In this case, log files of the latest generation have not been compressed, and hence the log files of the latest generation are compressed before transmitted.

Third Modification

In the first embodiment, in the communication terminal 10, the transmission timing distribution processing unit 123 provides a time lag for transmission start at random. As the time lag, a time lag value different for each communication terminal 10, which is derived from the last two digits of the terminal ID of the communication terminal 10 or fourth octet information on an IP address (IPv4), may be used.

Fourth Modification

In the communication terminal 10, when a new teleconference is started upon reception of user's operation from the operation input reception unit 102 during transmission of the terminal log information d2, the transmission timing determining unit 121 may detect the start of the new teleconference and cancel the transmission of the terminal log information d2. In this manner, even when a new conference is started, the degradation of conference quality due to congestion of the communication line band can be prevented.

Fifth Modification

After terminal log information d2 is transmitted, the transmitted terminal log information d2 may be deleted from the storage unit 1000 in the communication terminal 10. For example, whether the transmission of terminal log information d2 to be transmitted has been completed can be determined based on a request result from the log upload server 24, and hence, when the transmission has been completed, the transmission target determining unit 122 deletes the corresponding terminal log information d2 as the transmitted terminal log information d2. In this manner, the storage area in the communication terminal 10 can be effectively utilized.

Sixth Modification

In the first embodiment, the log transmission control unit 120 is configured to autonomously determine transmission timing and appropriately transmit logs. Another functional unit configured to perform login processing or conference start/end processing may inquire of the log transmission control unit 120 about the availability of log transmission after the end of the processing, and transmit the terminal log information d2 when the inquiry result is "OK".

Seventh Modification

The load balancing control device 223 may change the number of subordinate log upload servers 24 by increasing or decreasing the number of the log upload servers 24 depending on processing load on the log upload servers 24.

The processing load corresponds to, for example, the communication traffic (log size) of the terminal log information d2 to the load balancing control device 223 or the number of simultaneously received requests. The processing load corresponds to an average CPU usage or an average memory usage of the log upload servers 24. These are examples of an index for determining the processing load, and the index is not limited thereto and another index may be used. In this manner, server resources in the communication management system can be efficiently used depending on the load on log upload processing.

Eighth Modification

The log upload server 24 may distribute storage destinations to different internal tables rather than different internal DBs depending on the type of terminal log information d2.

Ninth Modification

When the communication terminal 10 has failed to transmit terminal log information d2 during transmission for some reason (transmission has not been completed), the communication terminal 10 may transmit terminal log information d2 in the next transmission together with the previous terminal log information d2. Examples of such case include transmission cancel, transmission fail, disconnection, and power interruption. In such cases, the communication terminal 10 transmits the current log information and an untransmitted part of the previous log information collectively at a predetermined timing, for example, after the end of a teleconference between the communication terminal 10 and other communication terminals 10. Alternatively, the communication terminal 10 transmits the current log information and an untransmitted part of the previous log information collectively immediately after the communication terminal 10 logs in the communication management system 20. In this manner, even when the transmission of logs has failed, the terminal log information d2 is not missed, and the log upload server 24 can reliably collect the terminal log information d2.

The computer program to be executed in the communication system in the present embodiment and the modifications is provided while being recorded in a computer-readable recording medium such as a CD-ROM, a flexible dick (FD), a CD-R, and a digital versatile disc (DVD) as a file in an installable format or an executable format.

The computer program to be executed in the communication system in the present embodiment and the modifications may be stored on a computer connected to a network such as the Internet and provided by being downloaded through the network. The computer program to be executed in the communication system in the present embodiment and the modifications may be provided or distributed through a network such as the Internet.

The computer program in the present embodiment and the modifications may be provided while being incorporated in a ROM in advance.

The present invention has an effect that log information can be reliably transmitted without degrading image quality.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication system comprising:
a plurality of communication terminals configured to transmit communication information, each communication terminal including processing circuitry configured to implement
a generator configured to generate log information on communication between the communication terminals,
a storage configured to store log information generated by the generator, and
a transmitter configured to upload log information that is capable of being uploaded depending on a communication line band used for the communication information; and
a communication controller that includes a communication management server configured to control transmission of the communication information and a log upload server, wherein the communication controller is configured to distribute the log information uploaded by the transmitter to the log upload server,
wherein
the transmitter includes a determiner configured to determine, from among pieces of log information, a pieces of log information that is capable of being uploaded without congesting a communication line band used for communication,
the transmitter uploads the piece of log information determined by the determiner, and
the communication controller performs control such that transmission information is transmitted to the communication management server, which is configured to manage communication between the communication terminals at multiple sites, when the transmission information is the communication information, and
transmission information is transmitted to the log upload server when the transmission information is the log information,
wherein
the storage accumulates the log information,
the transmitter performs an automatic upload of the log information at a predetermined timing,
the transmitter suspends the automatic upload during ongoing transmission of the communication information,
when it has been determined that communication between the communication terminals has ended after determining that there is no ongoing transmission between the communication terminals, the predetermined timing of the automatic upload is a timing after the end of communication between the communication terminals, and
when it has been determined that a current timing is not a timing after the end of communication between the communication terminals after determining that there is no ongoing transmission between the communication terminals, the predetermined timing of the automatic upload is a timing immediately after the communication terminal logs in the communication controller.

2. The communication system according to claim 1, further comprising a setter configured to set the timing of the automatic upload.

3. The communication system according to claim 1, wherein the transmitter cancels the transmission of the log information when new communication is started between the communication terminals during transmission of the log information.

4. The communication system according to claim 1, wherein, the transmitter deletes a piece of log information accumulated in the storage after the piece of log information is transmitted.

5. The communication system according to claim 1, wherein each of the communication terminals includes an optimizer configured to optimize the log information stored in the storage.

6. The communication system according to claim 5, wherein the optimizer performs, as the processing for optimizing the log information, file rotation that is limited to a maximum setting of a number of log file generations with a prescribed value as a reference of the file rotation.

7. The communication system according to claim 6, wherein the optimizer
includes a compressor configured to compress a file, and
compresses each log file, on which the file rotation has been performed, by the compressor as the processing for optimizing the log information.

8. The communication system according to claim 7, wherein the transmitter compresses by the compressor a log file of a latest generation, which has not been compressed at a time of transmission, and transmits the compressed log file.

9. The communication system according to claim 7, wherein the transmitter transmits minimum log information, which has not been transmitted, among log information obtained by the optimization processing.

10. The communication system according to claim 1, wherein, when transmission of the log information has not been completed during the transmission of the log information, the communication terminal transmits the log information, which has not been transmitted in a previous transmission, in the next transmission of log information.

11. The communication system according to claim 10, wherein the communication terminal transmits current log information and a previous log information, which has not been transmitted in a previous transmission, after end of communication between the communication terminals.

12. The communication system according to claim 10, wherein the communication terminal transmits current log information and a previous log information, which has not been transmitted in a previous transmission, immediately after the communication terminal logs in the communication controller.

13. The communication system according to claim 1, wherein the communication controller includes
a plurality of load balancing control devices, each being configured to perform load distribution to a plurality of servers, and
a communication request distribution device configured to distribute requests related to communication information and log information to the load balancing control devices depending on whether the request is related to communication information or log information, and
wherein a load balancing control device among the load balancing control devices, to which log information is distributed, performs limitation of communication band.

14. A method implemented by a communication system that includes a plurality of communication terminals configured to transmit communication information and a communication controller, the method comprising:
- at each communication terminal,
  - generating log information on communication between the communication terminals,
  - storing the generated log information, and
  - uploading log information that is capable of being uploaded depending on a communication line band used for the communication information,
- wherein the communication controller includes a communication management server configured to control transmission of the communication information and a log upload server, wherein the method further includes,
- at the communication controller, distributing the log information uploaded by each communication terminal to the log upload server, wherein
the method further includes
- determining, at each communication terminal, from among pieces of log information, a piece of log information that is capable of being uploaded without congesting a communication line band used for communication,
- uploading, by each communication terminal, the piece of determined log information determined by the determiner,
- performing control by the communication controller such that
  - transmission information is transmitted to the communication management server, which is configured to manage communication between the communication terminals at multiple sites, when the transmission information is the communication information, and
  - transmission information is transmitted to the log upload server when the transmission information is the log information,
- wherein the method further includes
  - accumulating the log information,
    - performing an automatic upload of the log information at a predetermined timing, and
    - suspending the automatic upload during ongoing transmission of the communication information,
- wherein when it has been determined that communication between the communication terminals has ended after determining that there is no ongoing transmission between the communication terminals, the predetermined timing of the automatic upload is a timing after the end of communication between the communication terminals, and
- when it has been determined that a current timing is not a timing after the end of communication between the communication terminals after determining that there is no ongoing transmission between the communication terminals, the predetermined timing of the automatic upload is a timing immediately after the communication terminal logs in the communication controller.

15. The communication system according to claim 1, wherein the communication controller is configured to identify transmission information in the form of communication information, which is one of voice data and video data, and identify transmission information in the form of log information, and the communication controller.

* * * * *